Dec. 26, 1944.    M. LITTMANN    2,365,965

CUTTING TOOL

Filed Jan. 11, 1943

Inventor
M. Littmann
By Hancock Downing Seebold
Attys.

Patented Dec. 26, 1944

2,365,965

UNITED STATES PATENT OFFICE 2,365,965

CUTTING TOOL

Martin Littmann, Buxton, England, assignor to Cutanit Limited, Buxton, England

Application January 11, 1943, Serial No. 472,029
In Great Britain December 30, 1941

1 Claim. (Cl. 29—95)

This invention relates to cutting tools, drawing and extruding dies, and like tools having a carbide or other hardened cutting or operative tip.

Such tools have hitherto been formed by brazing the tip on to a suitable shank and it sometimes happens that difficulties are experienced in the operation of the tool due to the overheating of the tip on account of the poor heat conductivity properties and low mechanical strength of the joint caused by the presence of remaining brazing flux, oxides and other impurities in the joint and in some cases to poor contact between the tip and the shank giving rise to intervening heat insulating air films.

The object of the present invention is to overcome the above difficulties by improving the mechanical strength of the joint and also the heat conductivity between the tip and the shank so that heat engendered at the tip in operation may be rapidly passed to the shank thus reducing the heating of the tip, and according to my invention I plate the abutting surfaces of tip and/or shank with copper, silver, or other good heat conducting metal or metals before the two are united by suitable means.

The invention also consists in providing an external bridge of high heat conductivity material across the shank and tip as, for example, by externally plating the two with copper, silver, or the like, leaving only the cutting or operative edge exposed.

Further features of the invention will be apparent from the description given hereafter.

Figure 1:
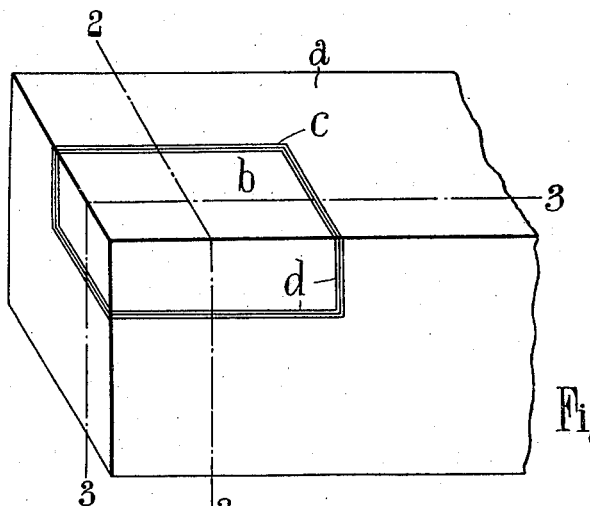
Figure 2:
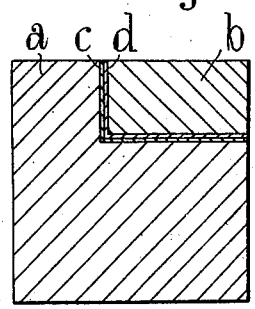
Figure 3:
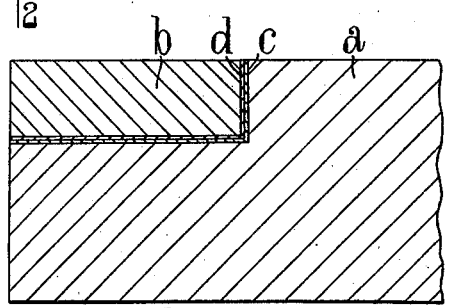

In the accompanying drawing,

Figure 1 is a perspective view of a tip and part of a shank united in accordance with the invention, and Figures 2 and 3 are sections respectively on the lines 2—2 and 3—3 of Figure 1.

Figure 4:
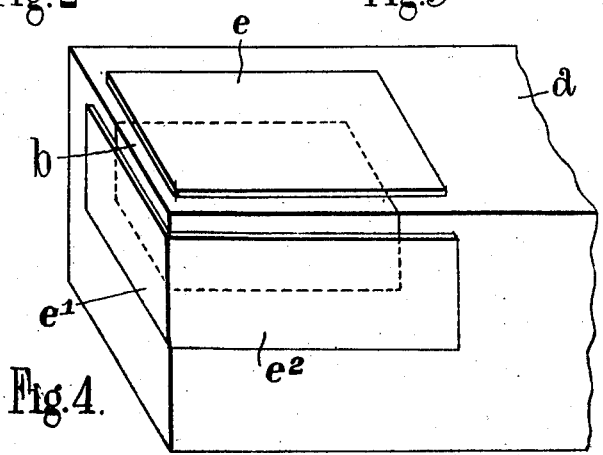

Figure 4 is a similar view to Figure 1 showing diagrammatically a modification according to the invention.

In carrying my invention into effect in one convenient manner I form my tool with a suitable shank $a$ by means of which it may be held in the lathe or other machine and also with a carbide or other suitably hardened tip $b$ shaped to suit the nature of the work for which it is required. The tip may normally be inserted within an angular recess at one end of the shank and the abutting surfaces of the tip and recess are coated with copper, silver, or other good heat conducting metal prior to their being united together by suitable means, the coatings being shown on an exaggerated scale by the layers $cd$.

The coating may be effected, for example, by electroplating, and when, for instance, employing a plating of copper I may use a bath consisting of 150 grams of copper sulphate (including the water of crystallisation), 25 grams of concentrated sulphuric acid, and 1 litre of distilled water, the bath operating at a temperature of about 25° C. and with a current density of 15 to 20 microamperes per square centimetre. The parts to be plated are inserted in the bath in the usual way and those surfaces not requiring a coating may be covered with wax or other suitable protective material. It will, however, be understood that any suitable means may be adopted for coating the surfaces with the high heat conductivity metal as, for example, the surfaces may be heated and sprayed or the metal may be evaporated on to the surfaces in a suitable vacuum furnace or in a furnace with an inert gas atmosphere, or they may be coated by dipping or by other suitable means.

Furthermore any suitable means may be adopted for uniting the coated parts together as, for example, they may be united by a brazing operation without the use of flux or they may be united by resistance welding or by being suitably clamped together with wire or the like and passed through a continuous furnace heated to a sufficient degree to effect autogenous welding or by any other suitable means.

It will further be understood that the thickness of the coating or coatings may be varied according to any particular requirements: for example, where a high degree of elasticity is required in the tool the coatings may be relatively thick so as to produce a cushioning effect while when high mechanical efficiency is required the coatings may be thin.

It will also be understood that I may coat either the surfaces on the tip or the surfaces on the shank or both sets of surfaces may be suitably coated.

In some cases also, I may coat one surface with one metal or alloy, and the other surface with another metal or alloy so that on heating the two surfaces to an appropriate temperature a eutectic of the two metals will be formed. In some cases a separate metal may also be inserted as brazing material between the two coated surfaces. In such cases the temperature to which the surfaces are heated will be lower than the melting point of either of the metals used.

In order to obtain an additional rapid dissipation of heat from the tip I may form an outside bridge of high heat conductivity metal across the tip and shank as, for example, by externally coating the adjacent surfaces of tip and shank with copper, silver or the like, leaving only the cutting or operative edge of the tip exposed. Such outside bridges extending across the shank $a$ and tip $b$ are indicated diagrammatically by the rectangles $e$, $e^1$ and $e^2$ in Figure 4, the thickness of the material forming the bridges being shown exaggerated.

Generally it will be understood that the invention extends broadly to the formation of a high heat conductivity and mechanically strong joint between the operative tip of a cutting or like tool and the shank or member upon which, or in a recess in which, the same is held, and the invention is therefore not to be limited to the foregoing description which is given purely by way of example to indicate the nature of the invention.

I claim:

A tool compriisng a shank having a recess therein, a tip fitted in said recess, a layer of material of relatively high heat conductivity between the adjacent surfaces of and bonding the shank and tip together, and an external bridge constituted by a layer of material also of high heat conductivity applied over the juncture of the shank and tip and also to the portions of the external surfaces of the shank and tip at opposite sides of said juncture.

MARTIN LITTMANN.